(No Model.) 3 Sheets—Sheet 3.
E. BOHN.
APPARATUS FOR TREATING COTTON SEED HULLS.
No. 438,984. Patented Oct. 21, 1890.
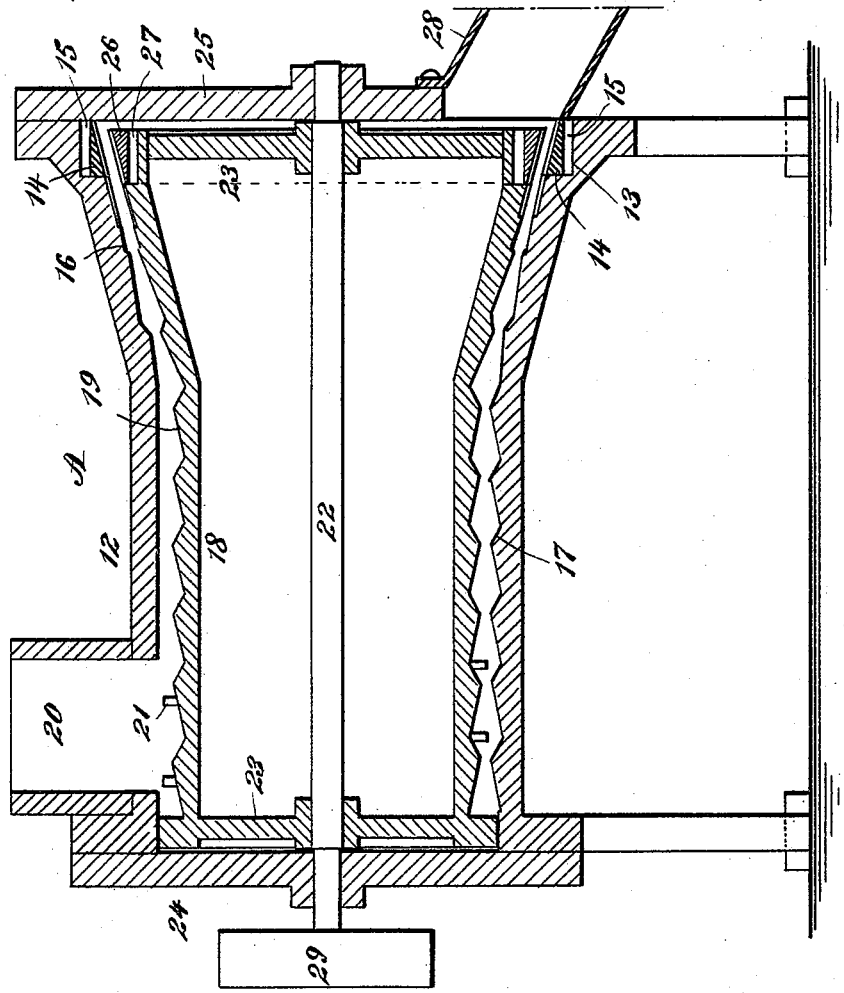
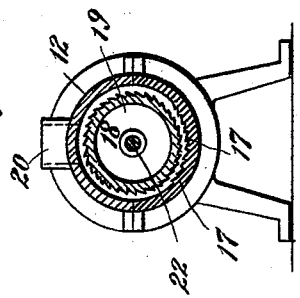
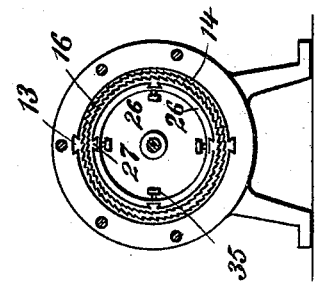
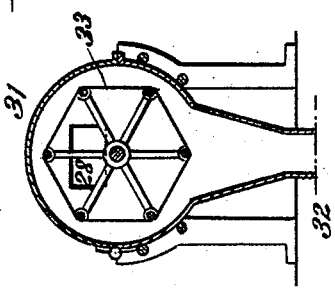
WITNESSES: INVENTOR:
E. Bohn
BY Munn & Co.
ATTORNEYS.

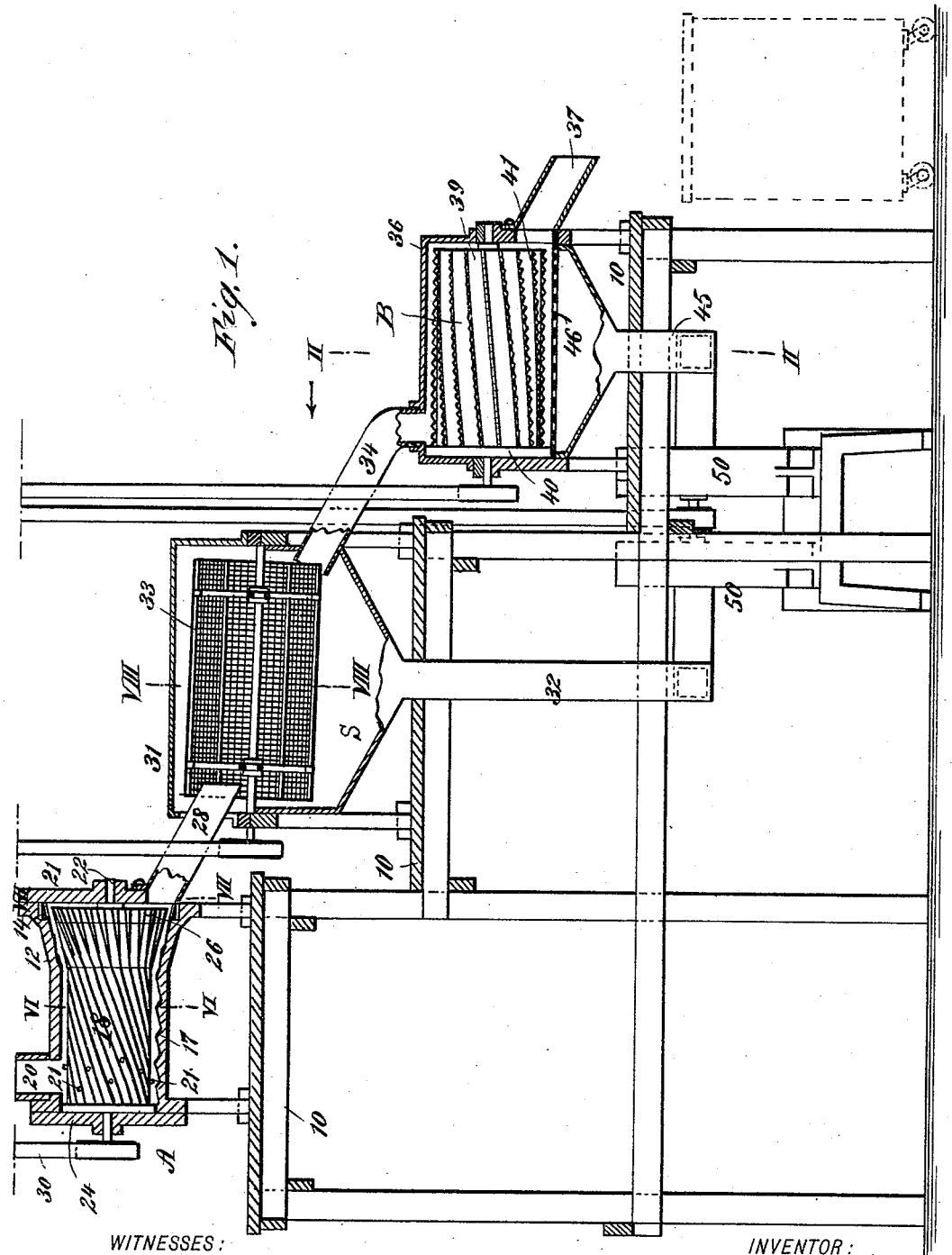

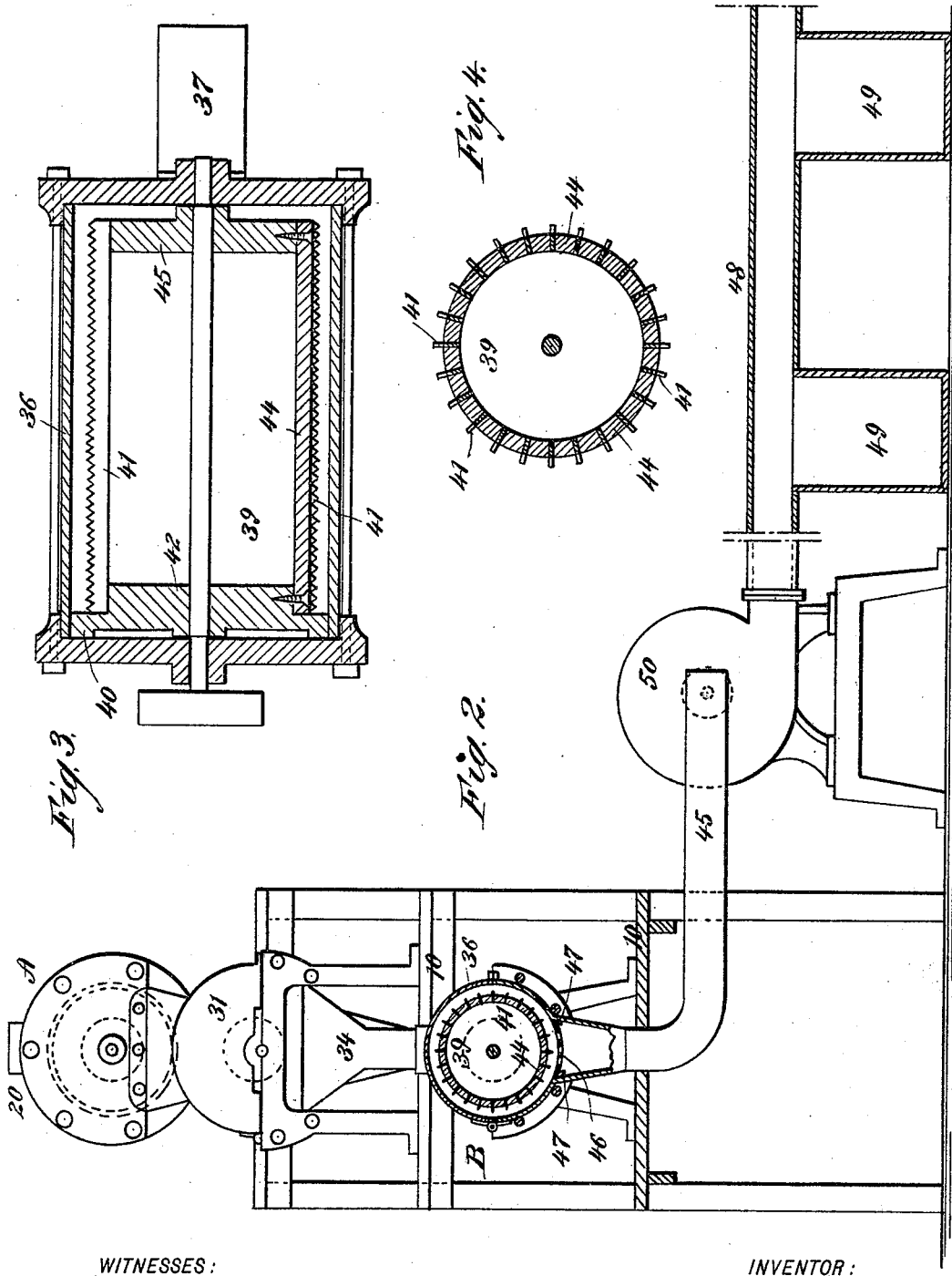

UNITED STATES PATENT OFFICE.

EMIL BOHN, OF GALVESTON, ASSIGNOR OF TWO-THIRDS TO H. O. ENGELKE, OF BRENHAM, AND THEODORE VINKE, OF GALVESTON, TEXAS.

APPARATUS FOR TREATING COTTON-SEED HULLS.

SPECIFICATION forming part of Letters Patent No. 438,984, dated October 21, 1890.

Application filed September 19, 1889. Serial No. 324,396. (No model.)

*To all whom it may concern:*

Be it known that I, EMIL BOHN, of Galveston, in the county of Galveston and State of Texas, have invented a new and Improved Apparatus for Treating Cotton-Seed Hulls, of which the following is a full, clear, and exact description.

My invention relates to an apparatus for producing raw paper-stock from cotton-seed hulls; and it has for its object to provide a simple and durable plant capable of use in carrying out a dry process of reducing the hulls to a finely-divided condition.

The invention consists in the novel construction and combination of the several parts of the apparatus used in carrying out the process, as will be hereinafter more fully set forth, and pointed out in the claims.

Reference is to be had to the accompanying drawings, forming a part of this specification, in which similar letters and figures of reference indicate corresponding parts in all the views.

Figure 1 is a central vertical section through the connected apparatus, illustrating the same in position for use. Fig. 2 is a section on line 2 2 of Fig. 1, looking in the direction of the arrow, parts being shown in elevation. Fig. 3 is a horizontal section through the agitator employed. Fig. 4 is a transverse section through the cylinder of said agitator. Fig. 5 is a central vertical section through the grinding-mill. Fig. 6 is a transverse section on line 6 6 of Fig. 1. Fig. 7 is a section on line 7 7 of Fig. 1; and Fig. 8 is a transverse section through the screen, taken on line 8 8 of Fig. 1.

For convenience of illustration I have shown the several parts of the apparatus as mounted upon a stepped platform 10, which platform is supported by suitable standards 11. Upon the upper or highest step of the platform a grinding-mill A is secured, which mill consists of a casing 12, cylindrical for the greater portion of its length, the said casing being flared at one end. At the flaring end of the casing, upon the inner face, a recess is produced, and in the wall of the said recess at suitable distances apart a series of essentially dovetail grooves 13 is formed, and in said recess a ring 14 is introduced provided with dovetail lugs 15, adapted to enter the said grooves 13. The inner face of the ring 14, and likewise the inner face of the entire flaring surface of the casing, is diagonally ribbed in such manner as to form, essentially, a series of knives, producing an effective grinding-surface, as shown at 16 in Figs. 5 and 7, and upon the lower portion of the inner face of the casing a series of essentially spirally-arranged longitudinal ribs 17 is produced, which ribs constitute a further grinding-surface. The ends of the longitudinal ribs are made to abut the opposed ends of the ribs upon the flaring surface of the casing. Thus the interior of the casing at the bottom is provided with a grinding-surface extending from the front to the rear.

Within the casing 12 a grinding-cylinder 18 is mounted, the said cylinder being made to conform in exterior contour to the interior contour of the casing, as shown in Figs. 1 and 5, and upon the outer surface of the cylinder 18 a series of sharp knife-like ribs 19 is formed, whereby any material introduced into the casing when the cylinder 18 is revolving will be ground by frictional contact with the opposed grinding or knife-like surfaces of the casing and cylinder.

Upon the casing 12, near one end, a hopper 20 is constructed communicating with the interior, as shown in Figs. 1 and 5, and immediately below said hopper a series of pins 21 is secured upon the exterior surface of the cylinder 18, the said pins being adapted to facilitate the feeding of the material to be ground from the hopper into the cylinder. The cylinder 18 is preferably made hollow, and a shaft 22 is passed through the cylinder, being attached thereto by spiders 23 or similar devices. The ends of the said shaft are journaled in the heads 24 and 25 of the casing.

In the peripheral surface of the cylinder 18, at its flaring extremity, an annular recess is produced, and in the wall of said recess at suitable intervals apart a series of transverse dovetail grooves is formed, and in the recess a ring 26 is introduced provided with dovetail lugs 27, which enter the dovetail grooves and serve to retain the ring in the said recess of the cylinder. The outer face of the ring 26 is flush with the outer face of the cylinder and the ribs formed upon the said outer face of the cylinder are continued upon the ring.

The object of introducing the ring 26 in the cylinder and the ring 14 in the casing is to provide a means whereby should the ribs at the flaring extremities of the cylinder and casing become dull they may be replaced with sharper ribs by simply removing the old rings and substituting new ones. This provision is made only at the flaring extremities of the cylinder and casing, as at that point the wear and tear are the greatest.

The ring 14 is effectually prevented from slipping outward by the head 25, and in order that the cylinder-ring may be tightly bound to place set-screws 35 are entered through the interior of the cylinder into the lugs 27 of the ring. The head 25 of the casing 12 is cut away at its lower end to provide an opening leading into the interior, around which opening a chute 28 is secured, which chute is given a downward inclination. The shaft 22 is provided with a suitable pulley 29, which is connected by a belt 30 with a drive-shaft suitably located.

Upon the second step of the platform a separator S is mounted, the casing 31 of which has its bottom downwardly contracted to the central point, and at said central point is provided with a chute 32, carried perpendicularly downward. Within the casing 31 any suitable form of rotary sieve or screen 33 is mounted, the sieve preferably employed being in the form of a bolting-reel, as best illustrated in Figs. 1 and 8. The sieve or screen is given a gentle downward slope, and in the higher end the chute 28 of the grinding-mill A is introduced, a suitable opening being made in one end of the casing for the admission of the said chute. Both ends of the sieve are open, and in the end of the casing opposite to that through which the chute 28 is passed a chute 34 is entered, over which chute the lower end of the sieve revolves, whereby the contents of the sieve as they slide downward over the meshes enter the chute 34 and are conducted to the agitator B, as shown in Figs. 1 and 2. The agitator B consists of a casing 36, which is mounted upon the lowermost step of the platform 10, the said casing being provided upon its upper surface with an opening through which the chute 34 enters and at its forward end with another opening surrounded by the delivery-chute 37.

Within the casing 36 a drum 39 is held to revolve, having a peripheral flange 40 formed upon its rear end to form a shield to prevent the material entering the agitator passing between the end of the agitator-cylinder and casing, and the said drum is also provided with a series of teeth 41, arranged in diagonal rows across the exterior from end to end of the same, so as to thoroughly stir and agitate the material passing into it. The drum is usually constructed as shown in Figs. 3 and 4, in which it will be observed that two heads 42 and 45 are connected by a series of bars or strips 44, of less thickness than the width of the toothed bars, one of which is placed between each two opposed toothed bars. The bars and strips form the surface of the drum. The bottom of the casing 36 of the agitator is inclined from its sides and ends downward in the direction of its center, and from the central depressed portion of the bottom a chute 45 is projected downward.

Immediately above the depression in the bottom of the casing 36 a sieve 46 is located, which sieve forms a continuation of the side walls of the casing, said casing being preferably circular, as illustrated in Fig. 2. Thus any material delivered by the chute 34 into the agitator will pass off over the sieve 46 into the delivery-chute 37, and the product sifted through the sieve finds an exit through the lower perpendicular chute 45.

The object of the agitator B is to thoroughly stir and agitate the material passing into it, so as to more effectually secure the separation of the finer particles of hulls and the fibers from the coarser particles.

The sieve 46 is detachable, being preferably supported upon slideways 47, formed upon the depressed or inclined side walls and the bottom of the casing, as best shown in Fig. 2. Thus a sieve of coarse or of fine mesh may be placed in the bottom of the agitator, as the product to be agitated may require.

Below the lowest platform 10 a tube or equivalent inclosure 48 is horizontally supported, which tube may be of any desired length, and a series of wells or pockets 49 is connected with the bottom of said tube at proper intervals apart, as best illustrated in Fig. 2, and at one end of said tube fans 50, of any approved pattern, are located, with which fans the delivery-chutes 32 and 45 of the separator and agitator are connected.

In operation the cotton-seed hulls as removed from the seed are introduced into the mill A and there ground, and the ground seed-hulls passing from the mill through the chute 28 are delivered into the rotary sieve or screen 33 of the separator. From thence the screened product passes through the chute 34 into the agitator and is there agitated or loosened up. From thence the product, and which constitutes the second grade of paper-stock, passes through the delivery-chute 37 into any suitable vessel placed to receive it. The fine particles passing through the rotary screen or sieve 33 and the screen or sieve 46 of the agitator are drawn downward through the chutes 32 and 45 by the fans 50 and blown into the tube 48, whereupon the heavier particles fall into the first pocket or well 49, and the lighter particles drop into the wells or pockets farther along the tube. The very finest of these particles, and which are deposited in the pockets farther along the tube, constitute the first grade of paper-stock, and the coarser waste particles which fall into the first pocket may be utilized as food for cattle.

It will be understood that by reason of the fans being connected with the casings of the separator and the agitator a suction will be produced, and consequently a larger quantity of the hulls and fiber will be drawn through the sieves than would otherwise pass through.

The shaft of the toothed drum 39 and also the reel-shaft are driven from the shaft with which the grinding-shaft 22 is connected.

The cylinder of the grinding-mill, the revolving screen or sieve, and the toothed drum of the agitator are all made to rotate in the same direction. The fans 50 are likewise driven from the main shaft above referred to.

I desire it to be distinctly understood that I do not confine myself to the exact arrangement of the several portions of the apparatus illustrated, nor to the exact arrangement or form of the tube 48 and blower.

Having thus described my invention, I claim as new and desire to secure by Letters Patent—

1. An apparatus for producing paper-stock from cotton-seed hulls, comprising a crushing-mill, a separator to which the crushed hulls are delivered, and an air-blast grader connected to the separator, substantially as described.

2. An apparatus for producing paper-stock from cotton-seed hulls, consisting of a grinding-mill, a screen, an agitator, and means for connecting the same, substantially as specified.

3. In an apparatus for producing paper-stock from cotton-seed hulls, the combination, with a separator and an agitator, of an air-blast grader, substantially as and for the purpose specified.

4. In an apparatus for producing paper-stock from cotton-seed hulls, the combination, with the outlets of a separator and an agitator, of an air-blast separating or grading device connected with the said outlets, as and for the purpose specified.

5. In an apparatus for producing paper-stock from cotton-seed hulls, a grinding-mill consisting of a casing having one flaring end, a detachable ring in said end and provided with an interior ribbed or grinding surface at the bottom and the flaring end and ring, and a grinding-cylinder journaled in the casing, conforming to its interior contour, provided with a detachable ring at its flaring end, said ring having a grinding-surface, substantially as described.

6. In an apparatus for producing paper-stock from cotton-seed hulls, the combination, with a casing having one flaring end and an interior ribbed or grinding surface upon the bottom and said flaring end and provided with a detachable ring inserted at the flaring end and having an inner grinding-surface, of a cylinder held to revolve within and conforming to the interior contour of the casing, feed-pins secured upon the periphery of said grinding-cylinder below the casing-inlet, and a detachable ring provided with a grinding-surface secured upon the flaring end of the cylinder, adapted to co-operate with the ring of the casing, substantially as and for the purpose specified.

7. In an apparatus for producing paper-stock from cotton-seed hulls, an agitator consisting of a casing having a depressed bottom, a detachable screen held in the bottom, and a drum held to revolve in the casing, provided with a series of diagonal or spirally-arranged teeth, substantially as shown and described.

8. In an apparatus for producing paper-stock from cotton-seed hulls, the combination, with an agitator consisting of a casing having a depressed bottom, a removable screen held in said bottom, and a drum held to revolve in the casing, provided with a series of diagonal or spirally-arranged teeth, of a tube provided with a series of pockets, a fan, and a connection between the fan, the bottom of the agitator, and the tube, substantially as specified.

EMIL BOHN.

Witnesses:
J. F. ACKER, Jr.,
EDGAR TATE.